United States Patent [19]
Vlasak

[11] 3,948,438
[45] Apr. 6, 1976

[54] THERMOSTAT SYSTEM
[75] Inventor: Robert C. Vlasak, Toledo, Iowa
[73] Assignee: Lennox Industries Inc., Marshalltown, Iowa
[22] Filed: July 17, 1974
[21] Appl. No.: 489,414

[52] U.S. Cl.................. 236/9 A; 62/202; 236/68 B; 165/26; 337/377
[51] Int. Cl.²......................................... G05D 23/30
[58] Field of Search....... 236/68 B, 9 A, 11; 165/26; 337/377; 219/511 Y, 505 Y; 338/22 R; 62/202

[56] References Cited
UNITED STATES PATENTS

| | | | |
|---|---|---|---|
| 2,751,153 | 6/1956 | Seifert............................ | 236/11 X |
| 2,767,922 | 10/1956 | Rennecamp..................... | 236/9 A |
| 3,231,522 | 1/1966 | Blodgett et al................. | 338/22 X |
| 3,445,632 | 5/1969 | Lewis............................. | 219/511 |
| 3,564,199 | 2/1971 | Blaha............................. | 219/505 |
| 3,799,433 | 3/1974 | Bauer et al..................... | 236/68 B |

*Primary Examiner*—William E. Wayner
*Attorney, Agent, or Firm*—Allegretti, Newitt, Witcoff & McAndrews

[57] ABSTRACT

The disclosure describes an improved thermostat for a heating or cooling system which is capable of accurately controlling the duration of the cycle periods of the system. The improved thermostat includes an anticipator capable of dissipating heat at a substantially constant rate over a wide range of applied voltages and current. According to a preferred teaching of the disclosure, the anticipator comprises a thermistor consisting of positive temperature coefficient (PTC) material.

16 Claims, 4 Drawing Figures

THERMOSTAT SYSTEM

BACKGROUND AND SUMMARY OF THE INVENTION

This invention relates to thermostats and more particularly relates to thermostats employing anticipator resistors.

An elementary thermostat for a heating system employs a thermostatic switch which closes a circuit supplying power to a heat source when the air in a room controlled by the heating system cools below a predetermined temperature. The thermostatic switch shuts off the power to the heat source when the system has heated the air in the room to a second predetermined temperature. However, conventional heating systems, such as forced air gas furnaces, continue to supply heat to the room after the power to the heat source is shut off. Heat continues to be supplied because the heat exchanger and plenum of a conventional gas furnace acquire a considerable amount of heat from the heat source which would be wasted if the heat were not circulated to the room after the heat source is turned off. The continued supply of heat to the room results in an overshoot of the desired temperature which is not anticipated or corrected by an elementary type of thermostatic control.

To correct the overshoot of temperature inherent in the elementary control system described above, it is conventional to use a thermostat employing an "anticipator." The anticipator is a small resistance heating element which controls the cycle period of the heating system by supplying heat directly to the thermostat bimetal when the thermostatic switch contacts are closed, so that the contacts are opened before the surrounding environment actually reaches the desired temperature, thus "anticipating" the reaching of the desired temperature which occurs at a later time due to the continued transfer of heat from the heat source after the contacts are opened. The thermostat bimetal is thus responsive to both room temperature and heat from the anticipator. It is desired to maintain as closely as possible a control temperature and variations from such control temperature are called "droop."

The cycle rate is a function of the anticipator and it is preferred that the burner (in a gas furnace) remain on for a predetermined minimum period of time (for example, two and one-half to three minutes) in order to adequately heat the heat exchanger surface and prevent cold spots from being below the dew point of the flue products, which cold spots might result in condensation that could cause corrosion and decrease the life of the heat exchanger. The minimum cycle period is desirably just long enough to evaporate condensed combustion products of the heating system and is somewhat variable depending on the burner parameters. A cycle includes both burner on time and burner off time, for example, six cycles per hour might include six 3 minute on cycles and six 7 minute off cycles.

the anticipator in conventional thermostats is adjustable to compensate for certain operating conditions, as for example, chronic low voltage. However, such adjustment might undesirably alter the cycle rate.

Manufacturing variations cause wide variance in thermostat performance, and only increase problems in control caused by variances in load and current in use. A faulty voltage supply to a conventional anticipator can cause variable cycle periods. In most systems, the anticipator is powered by a varying unregulated voltage supply in which the voltage varies with changes in line voltage and amperage load on the transformer. The instability of the voltage drastically affects the cycle period resulting from the operation of the anticipator.

If corrosion were the only problem, anticipators could be adjusted to provide extra long cycle periods. Unfortunately, this "solution" would result in widely fluctuating room temperatures meaning considerably less comfort and increased fuel consumption.

Erratic cycle periods due to faulty voltage supplies might be better controlled by regulating the voltage supplies. However, this is an expensive undertaking which also increases the maintenance costs of the resulting heating and/or cooling system.

It has been discovered that the deficiencies of conventional anticipators can be overcome and improved operation can be achieved by providing an anticipator which dissipates heat at a substantially constant rate over a wide variation of supply voltages and current. Such an anticipator enables the on cycle period to be maintained above a minimum time duration to provide longer life for the heat exchanger in the furnace and increase the comfort level.

the applicant has also discovered that heating system cycle periods can be stabilized without resorting to costly regulated voltage supplies by employing an anticipator which dissipates heat at a substantially constant rate over a range of supply voltages.

According to another aspect of the invention, the applicant has discovered that improved anticipator operation can be achieved if the anticipator comprises a positive temperature coefficient (PTC) thermistor.

According to another feature of the invention, an anticipator capable of dissipating heat at a substantially constant rate can be used in conjunction with a cooling system in order to afford advantages similar to those discussed above in connection with heating systems. According to this feature of the invention, the cooling anticipator is also fabricated from a thermistor having a positive temperature coefficient.

DESCRIPTION OF THE DRAWINGS

These and other advantages and features of the invention will hereafter appear in connection with the accompanying drawings wherein like numbers refer to like parts throughout and wherein.

DESCRIPTION OF THE PREFERRED EMBODIMENTS

Figure 1:
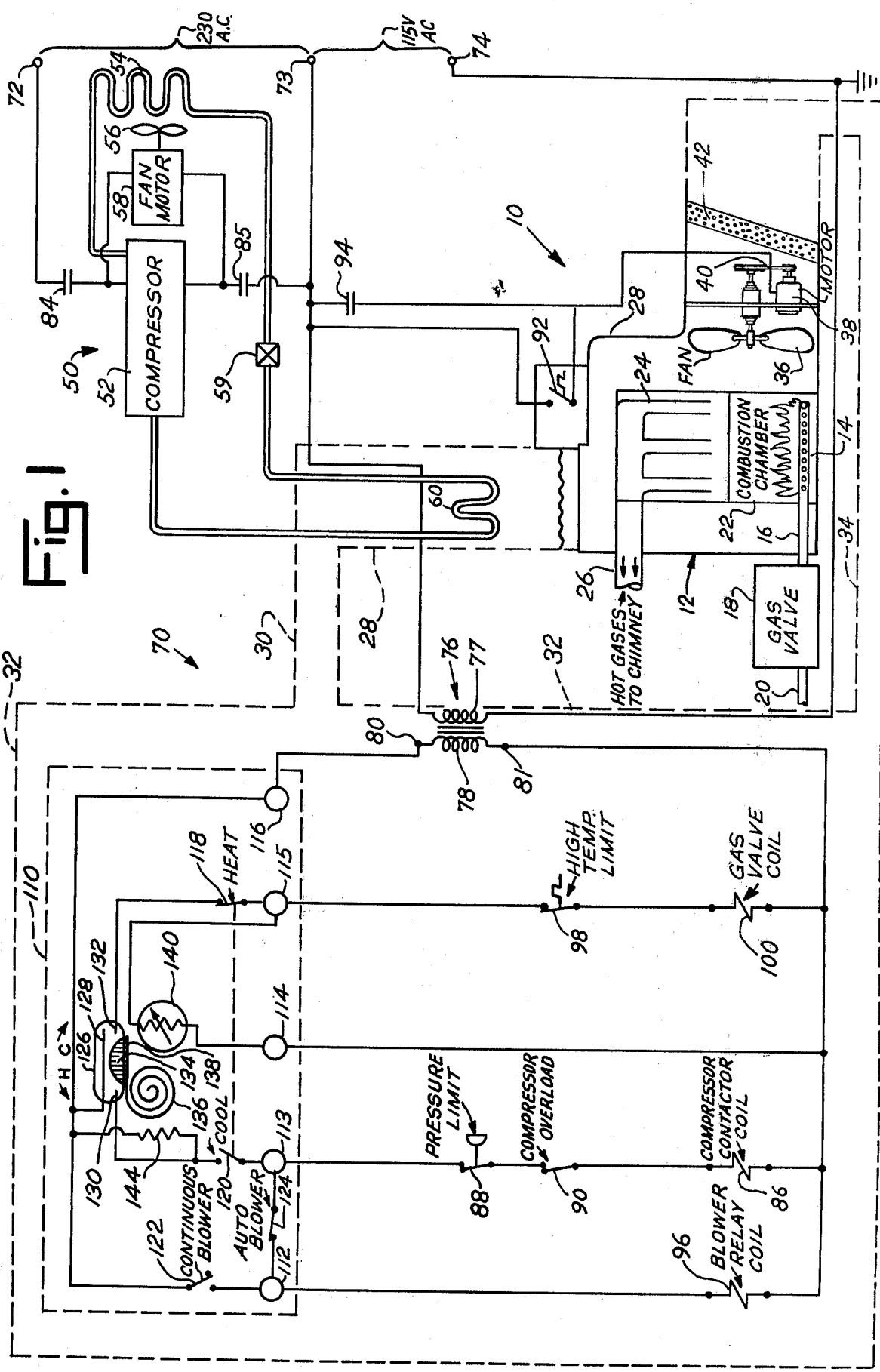
FIG. 1 is a schematic drawing illustrating a preferred form of thermostat made in accordance with the present invention for use in connection with conventional cooling and heating systems adapted to condition the air in a working space.

Referring to FIG. 1, a preferred form of apparatus made in accordance with the present invention basically comprises a heating system 10, a cooling system 50, a control system 70, and a thermostat 110, including a novel heating anticipator 140.

Heating system 10 includes a conventional gas, forced-air furnace 12 that employs a gas burner 14 to burn gas. Gas is supplied to the burner through a line 16, a gas valve 18 and an inlet line 20 which is connected to a source of gas under pressure (not shown). The gas is burned in combustion chamber 22 of heat exchanger 24, and the combustion products pass through the heat exchanger 24 and a flue 26 to a chimney (not shown). Heat exchanger 24 is surrounded by a plenum 28 which is heated by the combustion of gas in chamber 22.

The hot air in the plenum is conducted through an air duct 30 to a working space 32 which can be a room in a residential home. Air from the room is returned to the furnace through an air duct 34, and air is circulated through the system by a fan 36. The fan is driven by an electrical motor 38 through a belt and pully arrangement 40. Prior to passing through fan 36, the air is filtered by a conventional air filter 42.

Cooling system 50 typically comprises a refrigerant compressor 52 which pumps and compresses refrigerant gas to condensor coils 54. Air is forced over coils 54 by conventional fan 56 driven by an electrical motor 58 to condense the hot refrigerant gas. Liquid refrigerant from coils 54 passes through a conventional thermal expansion device, e.g., valve 59 and is conducted to evaporating coil 60 located in plenum 28. During cooling operation, the air circulated over coil 60 is cooled prior to passage into space 32.

Control system 70 comprises terminals 72-74 which are connected to conventional AC voltage sources. More particularly, terminals 72 and 73 are connected across a source of 230 volts AC, and terminals 73 and 74 are connected across a source of 115 volts AC. A step down transformer 76 comprising a primary coil 77 and a secondary coil 78 steps down the voltage from the 115 volt source to about 24 volts AC across output terminals 80 and 81.

The cooling controls include normally open compressor contactors 84 and 85, which are closed by the transmission of a control signal through a compressor contactor coil 86. The compressor is also controlled by a conventional pressure limit switch 88 and a conventional compressor motor overload switch 90 which operate in a well-known manner.

The heating controls include a plenum switch or bonnet switch 92 which is open when the plenum temperature is below about 90°F and is closed when the plenum temperature rises to about 150°F. A normally open blower relay contact 94 is closed when a control signal is transmitted through a blower relay coil 96. The heating controls also include a conventional high temperature limit switch 98 located on plenum 28 and a gas valve coil 100 which closes gas valve 18 in response to a control signal.

Thermostat 110 located in space 32 is used to operate control system 70 through terminals 112-116. The thermostat also includes a heat switch 118 and a cooling switch 120 that are physically ganged together so that one switch is opened when the other is closed and vice-versa. A continuous blower switch 122 and an automatic blower switch 124 are ganged together so that one switch is opened while the other is closed and vice versa.

The thermostat also includes a conventional glass envelope 126 in which is embedded a common thermostat contact 128, a hot thermostat contact 130, and a cold thermostat contact 132. A ball of mercury 134 is movable within the envelope under the influence of gravity in order to provide an electrical path between terminals 128, 130 or between terminals 128, 132. The thermostat further includes a bimetallic strip 136 formed in the shape of a coil. The outer end of the strip 136 terminates in a finger 138 which carries envelope 126 as shown. The coil is arranged and fabricated so that envelope 126 is rotated clockwise (in the direction of arrow C) as the room temperature decreases and is rotated counterclockwise (in the direction of arrow H) as the room temperature increases.

A novel heating anticipator 140 is located in heat transfer relationship with strip 136. Anticipator 140 is a thermistor having a positive temperature coefficient. That is, the anticipator is fabricated from a positive temperature coefficient (PTC) material, which in a steady state condition, will dissipate heat at a constant rate over a wide variation of supply voltage and current.

In the embodiment shown in FIG. 1, a conventional cooling anticipator resistor 144 is located in heat transfer relationship with strip 136.

Assuming the temperature outside space 32 is cold (e.g., 32°F), space 32 can be heated by closing heating switch 118 (simultaneously switch 120 is opened). In addition, switch 124 is closed so that switch 122 is opened. Thermostat 110 should be adjusted to maintain a comfortable temperature such as 68°F. With the temperature in room below 68°F, murcury ball 134 completes an electrical circuit between contacts 128 and 132. Current from terminal 80 begins to flow through anticipator 140 and a control signal in the form of current from terminal 80 flows through gas valve coil 100 so that gas valve 18 opens, gaseous fuel flows to burner 14 and burner 14 begins to burn gas.

similarly, if the temperature of anticipator 140 tends to increase due to rapid cycling or an elevated temperature in space 32, the resistance of the anticipator increases, thereby decreasing the power dissipated therein. As a result, any tendency for the temperature of anticipator 140 to increase above temperature T2 is rapidly counteracted so that the temperature remains at or near T2.

The same result is reached if the temperature of anticipator 140 tends to decrease due to infrequent cycling or due to the maintenance of space 32 at a low temperature. Since anticipator 140 has a fixed mass, the ability of the anticipator to maintain a constant temperature also results in a constant steady-state rate of heat dissipation into bimetallic strip 136.

At the beginning of the heating cycle period, burner 14 begins to burn gas, and the temperature of plenum 28 rapidly increases. When the temperature increases to about 150°F, switch 92 is closed so that motor 38 is energized and fan 36 begins to circulate hot air from the plenum into the space 32. This increases the temperature of the air in space 32. As soon as the temperature of coil 136 reaches 68°F due to the combined heating of anticipator 140 and the air in space 32, contacts 128 and 132 are opened, and circuit 70 is switched to an off state in which the control signal current through gas valve coil 100 is terminated, thereby closing gas valve 18 and turning off burner 14 and ending the cycle period. However, fan 36 continues to operate until the temperature of the air in plenum 28 is reduced to about 90°F, at which point in time switch 92 opens in order to turn off motor 38.

By using the novel PTC anticipator shown in FIG. 1, it is possible to maintain the minimum on-cycle period at a duration of about 3 minutes over a wide range of voltages at terminal 80. As previously pointed out, an on-cycle period of about 3 minutes is sufficiently long to enable combustion by-products condensed on heat exchanger 24 to be evaporated. In addition, if the on-cycle period is about 3 minutes, the heat is applied to space 32 in short bursts, thereby maintaining a more nearly constant temperature in the space and resulting in reduced fuel consumption.

If thermostat 110 is reset to maintain space 32 at 80°F, circuit 70 is switched to the heating state when the air temperature is decreased below 80°F and is switched to the off state when the combined heat from the anticipator and the air heats coil 136 to 80°F. However, due to the unique operation of anticipator 140, the on-cycle period can remain at about 3 minutes.

Figure 2:
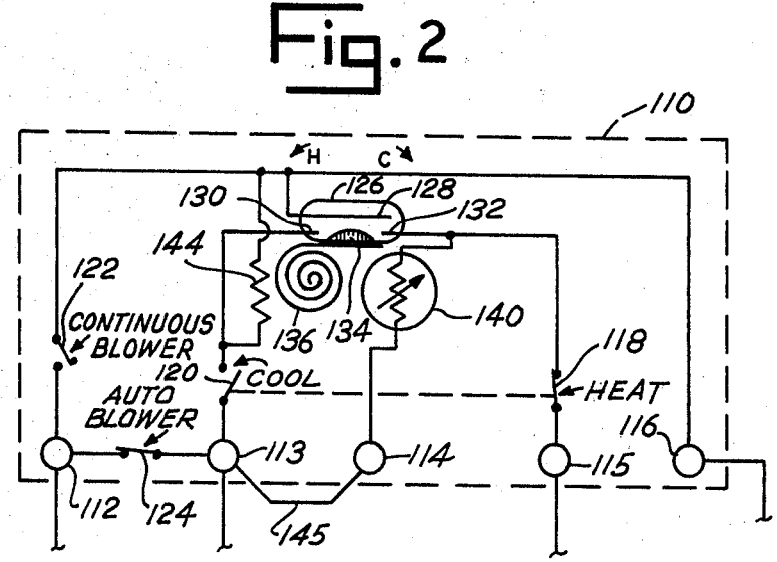
FIG. 2 is an alternative embodiment of the thermostat apparatus shown in FIG. 1.

FIG. 2 illustrates an alternative embodiment of thermostat 110 in which anticipator 140 is connected to terminal 113 by a jumper wire 145. This embodiment is advantageous when the compressor contactor coil 86 has a relative low impedance since it avoids the necessity of running a long wire from terminal 114.

Figure 3:
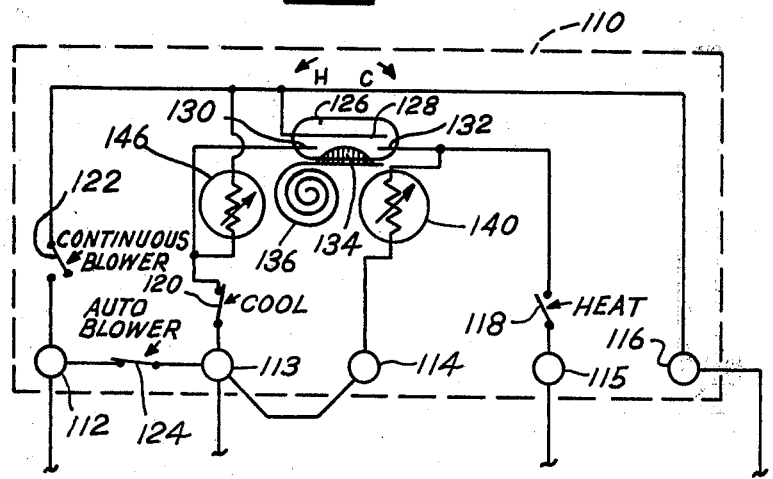
FIG. 3 is another alternative embodiment of the thermostat apparatus shown in FIG. 1.
Figure 4:
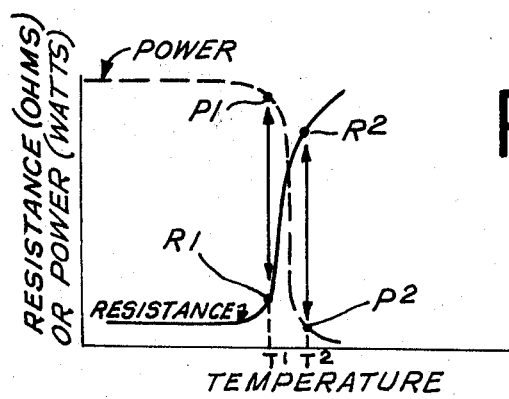
FIG. 4 is a schematic graph illustrating the operation of a preferred form of anticipator made in accordance with the present invention.

FIG. 3 illustrates another embodiment of thermostat 110 in which an anticipator thermistor 146 fabricated from PTC material is substituted for anticipator resistor 144. In order to operate cooling system 50 from the FIG. 3 embodiment of thermostat 110, switch 120 is closed so that switch 118 is open and switch 124 is closed so that switch 122 is open. In addition, bimetal strip 136 is arranged to cause mercury ball 134 to close an electrical circuit between the contacts 128 and 130 if the temperature of the air in space 32 increases above a comfortable room temperature, such as 70°F.

Anticipator 146 is in heat transfer relationship with coil 136. If the air temperature in space 32 decreases below 70°F, mercury ball 134 opens the contacts 128 and 130 so that circuit 70 is switched to an off state in which current from terminal 80 flows through anticipator 146. The resistance of anticipator 146 is sufficiently large so that the control signal to coils 86 and 96 is terminated and the coils are de-energized. As a result, contactors 84 and 85 are opened so that the motor of compressor 52 and fan motor 58 are de-energized, and fan 36 is turned off. In this state of operation, space 32 begins to absorb heat from the outside environment. At the beginning of the cycle period, when current begins to flow through anticipator 146, the anticipator reacts in the same manner described in connection with anticipator 140. That is, after a few seconds, anticipator 146 is heated to a steady-state temperature and dissipates heat at a constant rate. Strip 136 absorbs heat from anticipator 146 and the air in spece 32 until the temperature of strip 136 equals or exceeds 70°F. Mercury ball 134 closes the electrical circuit between contacts 128 and 130 os that anticipator 146 is shorted out of the circuit and current from terminal 80 in the form of a control signal flows through coils 86 and 96. As a result, contactors 84 and 85 are closed and the compressor 52 and the compressor fan motor 58 can operate.

It will be understood that other temperature responsive means may be used in place of the bimetal in the thermostat as for example, a bellows. Likewise, a reed switch or thermistor and associated circuitry could be employed in place of the mercury ball and contacts.

With the compressor 52 operative, the evaporator coil 60 is cooled. Fan 36 is operated to move air over coil 60 continues to dissipate heat at the same rate and the same temperature as the 70°F setting so that the cycle period remains nearly constant.

The present invention provides a fixed resistance PTC anticipator that is not adjustable in the field, thus obviating problems of improper field adjustment or tampering. The present thermostat requires no adjustment to current flow through the primary control to the heat source, for example, the gas valve. The chance of improper setting and adverse affect on the maintenance of a minimum on-cycle is obviated. The PTC anticipator in applicant's thermostat dissipates heat to the bimetal at a substantially constant rate, thereby providing desired control of the cycle and minimum on time over a wide range of variation of supply voltage and current. There is very little droop or variance from the set control point of the thermostat by use of the present invention. Manufacturing variations in construction of the thermostats are less likely to adversely affect operation by use of this invention.

Those skilled in the art will recognize that the embodiments described herein may be altered and modified without departing from the true spirit and scope of the invention as defined in the accompanying claims.

What is cliamed is:

1. Heating apparatus for maintaining the air in a working space at a first predetermined temperature at one time and at a second predetermined temperature at another time comprising in combination:

a heat source for generating heat into a heat reservoir;

a voltage source for generating a control current;

anticipator means including a thermistor responsive to the control current from the voltage source for dissipating heat at substantially the same steady-state rate at both the first and second predetermined air temperatures and over a predetermined range of voltages from the voltage source;

control means for energizing the heat source in response to a control signal;

electrical circuit means for interconnecting the voltage source, anticipator means and the control means, said electrical circuit means being switchable into a first state in which the control current is conducted to the anticipator means and the control signal is conducted to the control means so that the heat source generates heat, and switchable into a second state in which the control current is prevented from flowing through the anticipator means, and the control signal is terminated so that the heat source terminates the generation of heat;

circulation means for commencing the circulation of heat from the heat reservoir to the working space after the heat reservoir has been heated to a fixed temperature and for continuing the circulation of heat from the heat reservoir to the working space while the electrical circuit means is switched to the first state and for a period of time after the electrical circuit means is switched to the second state; and thermostat means reponsive to the temperature of the air and in heat transfer relationship with the anticipator means, said thermostat means being settable to a first condition for switching the electrical circuit means to the first state at a first point in time when the air temperature decreases below the first predetermined temperature and for switching the electrical circuit means to the second state at a second point in time when the combined heat from the air and the anticipator means raises the temperature of the thermostat means to the first predetermined temperature, said thermostat means being settable to a second condition for switching the electrical circuit means to the first state at a third point in time when the air temperature decreases below the second predetermined temperature and for switching the electrical circuit means to the second state at a fourth point in time when the combined heat from the air and the anticipator means raises the temperature of the thermostat means to the second predetermined temperature, whereby the substantially constant steady-state rate of heat dissipation in the anticipator means at the first and second predetermined temperatures irrespective of voltage variations of the voltage source prevents a first time period between the first and second points in time and a second time period between the third and fourth points in time from decreasing below a predetermined minimum time duration.

2. Apparatus, as claimed in claim 1, wherein the predetermined minimum time duration is 3 minutes or more.

3. Apparatus, as cliamed in claim 1, wherein the first and second time periods are substantially equal.

4. Apparatus, as claimed in claim 1, wherein the voltage source is unregulated.

5. Apparatus, as claimed in claim 1, wherein the thermistor comprises PTC material.

6. Apparatus, as claimed in claim 5, wherein the control means comprises a solenoid coil for opening a gas valve in response to the control signal.

7. Apparatus, as claimed in claim 6 wherein the electrical circuit means comprises means for connecting the thermostat means and the solenoid coil in series with the voltage source and means for connecting the anticipator means in parallel with the solenoid coil.

8. Apparatus, as claimed in claim 1, wherein the thermostat means comprises:
  a bimetallic strip in heat transfer relationship with the PTC material; and
  a switch carried by the bimetallic strip, said switch and bimetallic strip being settable to a first condition in which the switch closes when the air temperature decreases below the first predetermined temperature and opens when combined heat from the air and PTC material raises the temperature of the bimetallic strip to the first predetermined temperature and is settable to a second condition in which the switch closes when the air temperature decreases below the second predetermined temperature and opens when the combined heat from the air and the PTC material raises the temperature of the bimetallic strip to the second predetermined temperature.

9. Apparatus, as claimed in claim 8, wherein the voltage source comprises a step-down transformer.

10. Cooling apparatus for maintaining the air in a working space at a first predetermined temperature at one time and at a second predetermined temperature at another time comprising in combination:
  cooling means for removin heat from the air;
  a voltage source for generating a control current;
  anticipator means including a thermistor responsive to the control current from the voltage source for dissipating heat at substantially the same steady-state rate at both the first and second predetermined air temperatures and over a predetermined range of voltages of the voltage source;
  control means for energizing the cooling means in response to a control signal;
  electrical circuit means for interconnecting the voltage source, anticipator means and control means, said electrical circuit means being switchable into a first state in which the control current is conducted through the anticipator means and the control signal is terminated so that the cooling means stops removing heat from the air, and switchable into a second state in which the control current is prevented from flowing through the anticipator means and the control signal is conducted to the control means so that the cooling means removes heat from the air; and
  theremostat means responsive to the temperature of the air and in heat transfer relationship with the anticipator means, said thermostat means being settable to a first condition for switching the electrical circuit means to the first state at a first point in time when the air temperature decreases below the first predetermined temperature and for switching the electrical circuit means to the second state at a second point in time when the combined heat from the air and the anticipator means raises the temperature of the thermostat means to the first predetermined temperature, said thermostat means being settable to a second condition for switching the electrical circuit means to the first state at a third point in time when the air temperature decreases below the second predetermined temperature and for switching the electrical circuit means to the second state at a fourth point in time when the combined heat from the air and the anticipator means raises the temperature of the thermostat means to the second predetermined temperature, whereby the substantially constant steady-state rate of heat dissipation of the anticipator means at the first and second predetermined temperatures irrespective of voltage changes of the voltage source enables the time periods between the first and second points in the time and the third and fourth points in time to be accurately controlled.

11. Apparatus, as claimed in claim 10, wherein the voltage source is unregulated.

12. Apparatus, as claimed in claim 10, wherein the thermistor comprises PTC material.

13. Apparatus, as cliamed in claim 12, wherein the control means comprises a contactor coil for operating an air conditioning compressor.

14. Apparatus, as cliamed in claim 13, wherein the electrical circuit means comprises means for connecting the PTC material and the contactor coil in series with the voltage source and means for connecting the thermostat means in parallel with the PTC material.

15. Apparatus, as claimed in claim 14, wherein the thermostat means comprises:
  a bimetallic strip in heat transfer relationship with the PTC material; and
  a switch carried by the bimetallic strip, said bimetallic strip being settable to a first condition in which the switch opens when the air decreases below the first predetermined temperature and closes when the combined heat from the air and the PTC material raises the temperature of the bimetallic strip to the first predetermined temperature and settable to a second condition in which the switch opens when the air temperature decreases below the second predetermined temperature and closes when the combined heat from the air and the PTC material raises the temperature of the bimetallic strip to the second predetermined temperature.

16. Appratus, as claimed in claim 15, wherein the voltage source comprises a step-down transformer.

\* \* \* \* \*